US012627187B2

(12) United States Patent
Thumm et al.

(10) Patent No.: US 12,627,187 B2
(45) Date of Patent: May 12, 2026

(54) ROTOR OF AN ELECTRIC ASYNCHRONOUS MACHINE AND METHOD FOR ITS PRODUCTION

(71) Applicant: Wieland-Werke AG, Ulm (DE)

(72) Inventors: Gerhard Thumm, Erbach (DE); Volker Voggeser, Senden (DE); Michael Wolf, Ulm (DE); Jochen Walliser, Ulm (DE)

(73) Assignee: WIELAND-WERKE AG, Ulm (DE)

( * ) Notice: Subject to any disclaimer, the term of this patent is extended or adjusted under 35 U.S.C. 154(b) by 289 days.

(21) Appl. No.: 18/479,285

(22) Filed: Oct. 2, 2023

(65) Prior Publication Data

US 2024/0120792 A1     Apr. 11, 2024

(30) Foreign Application Priority Data

Oct. 5, 2022     (DE) ..................... 10 2022 003 680.0

(51) Int. Cl.
| | |
|---|---|
| *H02K 1/32* | (2006.01) |
| *H02K 15/023* | (2025.01) |
| *H02K 17/16* | (2006.01) |

(52) U.S. Cl.
CPC ............. *H02K 1/32* (2013.01); *H02K 15/023* (2025.01); *H02K 17/16* (2013.01); *H02K 17/168* (2023.05)

(58) Field of Classification Search
CPC ........ H02K 1/32; H02K 15/023; H02K 17/16; H02K 17/168; H02K 3/24; H02K 9/19
See application file for complete search history.

(56) References Cited

U.S. PATENT DOCUMENTS

| | | | |
|---|---|---|---|
| 5,682,074 | A | 10/1997 | Di Pietro et al. |
| 10,819,201 | B2 | 10/2020 | Thumm et al. |

(Continued)

FOREIGN PATENT DOCUMENTS

| | | |
|---|---|---|
| DE | 102017010685 A1 | 5/2019 |
| DE | 102018111993 A1 | 11/2019 |

(Continued)

OTHER PUBLICATIONS

European Search Report issued in corresponding European Application No. 23000124.0 with English translation of categories of cited documents, dated Feb. 26, 2024 (10 pages).

(Continued)

*Primary Examiner* — Christopher M Koehler
*Assistant Examiner* — Ethan Nguyen Vo
(74) *Attorney, Agent, or Firm* — FLYNN THIEL, P.C.

(57)     ABSTRACT

A rotor of an electric asynchronous machine including a shaft, a rotor core and short-circuit rings attached to end faces of the rotor. The shaft has an outer lateral radial surface, a cavity extending axially, at least one passageway located on the lateral surface, and at least one channel connecting the cavity to the passageway. The rotor core has at least one channel extending therein. At least one of the short-circuit rings is composed of at least two ring-shaped disks interconnected to form a disk pack. At least one disk of at least one short-circuit ring has recesses arranged such that a channel structure is formed in the short-circuit ring and is in fluidic connection with at least one channel of the rotor laminated core and fluidically connects the at least one passageway on the shaft lateral surface to at least one channel of the rotor core.

15 Claims, 3 Drawing Sheets

(56)          References Cited

U.S. PATENT DOCUMENTS

| | | | |
|---|---|---|---|
| 2009/0261667 A1* | 10/2009 | Matsubara | H02K 1/2766 |
| | | | 310/54 |
| 2024/0146163 A1* | 5/2024 | Büttner | H02K 17/16 |

FOREIGN PATENT DOCUMENTS

| | | | |
|---|---|---|---|
| EP | 1953896 | B1 | 8/2008 |
| JP | 2008219960 | A | 9/2008 |

OTHER PUBLICATIONS

German Office Action issued in corresponding German Application No. 10 2022 003 680.0, mailed May 24, 2023 (14 pages).

\* cited by examiner

ROTOR OF AN ELECTRIC ASYNCHRONOUS MACHINE AND METHOD FOR ITS PRODUCTION

CROSS-REFERENCE TO RELATED APPLICATION

This claims priority from German Application No. 10 2022 003 680.0, filed Oct. 5, 2022, the disclosure of which is hereby incorporated by reference in its entirety.

TECHNICAL FIELD

The invention relates to a rotor of an electric asynchronous machine and to a method for its production.

BACKGROUND AND SUMMARY

Such a rotor comprises a shaft, at least one rotor laminated core having a plurality of recesses, and at least one rotor cage. The rotor cage consists of electrically conductive rotor bars which are inserted into the recesses of the rotor laminated core in such a way that the rotor bars project beyond the rotor laminated core at their two end regions, and of short-circuit rings which are attached to the rotor laminated core at the end face and have a plurality of recesses which are arranged in the region of their outer circumference and into which the end regions of the rotor bars project.

In electric asynchronous machines, high temperatures are generated by eddy current losses in the rotor laminated core of the rotor. This makes additional cooling by means of a cooling fluid, usually oil, necessary, in particular in high-power machines. The cooling fluid is supplied by the rotor shaft and then taken up by additional end plates, which are attached to the end face on the rotor laminated core. The cooling fluid is fed via holes, made in these end plates, into the rotor laminated core into channels or grooves provided there. The cooling fluid then flows through the rotor laminated core parallel to the rotor axis and is subsequently discharged from the rotor. The disadvantage here is that holes have to be made in the end plates. This requires additional effort and thus costs.

One object of the invention is to provide a rotor of an electric asynchronous machine which eliminates these disadvantages, as well as a method for its production.

The invention relates to a rotor of an electric asynchronous machine. The rotor comprises a shaft defining an axial direction, a radial direction, and a circumferential direction. The shaft has an outer lateral surface in the radial direction, a cavity extending within the shaft in the axial direction, at least one passageway located on the lateral surface of the shaft, and at least one channel connecting the cavity to the at least one passageway. In other words, the channel is arranged to allow a fluid to flow from the cavity through the channel to the at least one passageway. Further, the rotor comprises a rotor laminated core having a first end face and a second end face opposite in an axial direction thereto, the rotor laminated core having at least one channel extending within the rotor laminated core from the first end face to the second end face. Short-circuit rings are attached to the end faces of the rotor laminated core, at least one of the short-circuit rings being composed of at least two disks interconnected to form a disk pack. Each disk has two circular ring-shaped surfaces. Surfaces of adjacent disks facing each other are in surface contact. According to the invention, at least one disk of at least one short-circuit ring has recesses which are arranged in such a way that a channel structure is formed in the short-circuit ring and is in fluidic connection with at least one channel of the rotor laminated core and fluidically connects the at least one passageway on the lateral surface of the shaft to at least one channel of the rotor laminated core.

The invention is based on the idea that short-circuit rings are provided on the end faces of the rotor laminated core in order to electrically connect the rotor bars inserted in the rotor laminated core to one another. At least one of the short-circuit rings is constructed here of at least two circular ring-shaped disks, and in that the disks are assembled and joined flat so that a disk pack is formed. Such short-circuit rings are known, for example, from DE 10 2017 010 685 A1. When the individual disks are produced, they can be provided with recesses without much additional effort. The recesses are made in at least one of the disks in such a way that, after the individual disks have been assembled and joined, a channel structure is formed by the recesses in the short-circuit ring and is designed in such a way that a fluid flowing in the cavity inside the rotor shaft can be supplied to the rotor laminated core through the channel structure. For this purpose, the channel structure is in fluidic connection with at least one channel of the rotor laminated core on the one hand, and, on the other hand, at the inner diameter of the short-circuit ring with the passageway on the lateral surface of the shaft. The channel structure, by means of which a fluid can be distributed from the rotor shaft to one or more channels in the rotor laminated core or can be taken up from one or more of these channels, is thus integrated in at least one of the short-circuit rings.

The particular advantage is that the additionally required end plates with the holes specially made therein can be spared. The recesses in at least one of the disks of a short-circuit ring can be made very inexpensively by stamping or punching directly during the production of the individual disks. Furthermore, the short-circuit rings made up of disks can take on the function of balancing disks.

The short-circuit rings are usually made of copper or a copper alloy. Due to the good thermal conductivity of copper and copper alloys, in the proposed rotor the short-circuit rings through which fluid flows also contribute to the overall cooling of the rotor.

The channels in the rotor laminated core can be arranged spatially separate from the rotor bars. Alternatively, they can also form a unit with the recesses in which the rotor bars are inserted.

In a preferred embodiment of the invention, each short-circuit ring can be composed of at least two disks interconnected to form a disk pack, and at least one disk of each short-circuit ring can have recesses arranged to form, in each of the short-circuit rings, a channel structure which is in fluidic connection with at least one channel of the rotor laminated core. The advantages described above are now provided for both short-circuit rings.

Furthermore, the forming of the recesses in at least one of the disks of both short-circuit rings enables a very flexible design of the channel structure and thus of the flow guidance of the fluid in the rotor laminated core. For example, it can be provided that the fluid enters one or more channels in the rotor laminated core at one end face and is collected at the other end by the channel structure of the short-circuit ring located there and then leaves the rotor. However, it is also possible that the channel structure in one of the short-circuit rings is designed in such a way that the fluid flowing out of the rotor laminated core from a first plurality of channels is deflected by 180° in the short-circuit ring and flows again through the rotor laminated core through a second plurality of channels.

In one embodiment of the invention, at least one disk of a short-circuit ring can have, on one of its surfaces, at least one recess in the form of a groove- or notch-like depression, by which, in combination with another disk, a channel is formed which constitutes at least part of the channel structure. Such a depression can be made in the surface of a disk particularly easily by stamping. Through such a depression it is possible to conduct a fluid in the radial direction and/or in the circumferential direction.

Within the scope of a particular variant of this embodiment, groove- or notch-like depressions of adjacent disks can be formed in such a way that they supplement each other to form a channel. This makes it possible to form channels with a particularly large cross-sectional area. The width of such a channel in the axial direction can be greater than the thickness of a single disk.

In another embodiment of the invention, the channel structure of at least one short-circuit ring can comprise at least one first recess extending in the radial direction and at least one second recess extending in the axial direction. In such a configuration of the channel structure, the fluid can be directed away from the shaft of the rotor in the radial direction and then supplied to the rotor laminated core in the axial direction.

Within the scope of a particular embodiment of this further embodiment, the second recess extending in the axial direction can be formed by a hole in at least one disk of a short-circuit ring.

In addition, it is advantageous that the channel structure of at least one short-circuit ring comprises at least one third recess extending in the circumferential direction. This makes it possible to distribute the fluid for cooling the rotor laminated core to several channels arranged in the rotor laminated core at different positions in the circumferential direction.

In a further advantageous embodiment of the invention, first recesses of at least one short-circuit ring can have flow cross-sections that are different within the short-circuit ring and/or second recesses of at least one short-circuit ring can have flow cross-sections that are different within the short-circuit ring and/or third recesses of at least one short-circuit ring can have flow cross-sections that are different within the short-circuit ring. In this way, the pressure drop when the fluid flows can be influenced and thus the distribution of the fluid to the channels in the rotor laminated core can be controlled.

Within the scope of another particular embodiment of the invention, the channel structure of at least one short-circuit ring can comprise at least one recess which is formed as a planar depression and which extends both in the radial direction and in the circumferential direction, and can further comprise at least second recesses which extend in the axial direction. A planar depression enables a particularly favorable distribution of the fluid in terms of pressure drop to a plurality of channels which are arranged in the rotor laminated core at different positions in the circumferential direction. In particular, it is advantageous that planar depressions of adjacent disks are formed in such a way that they supplement each other to form a space for the flow of the fluid. This makes it possible to form a space with a particularly large cross-sectional area for the flow of the fluid.

Within the scope of a particular embodiment of the invention, the rotor laminated core can have at least one first channel and at least one second channel, and the channel structure in one of the short-circuit rings can be designed such that a fluid flowing from the first channel of the rotor laminated core into the channel structure of the short-circuit ring is deflected there, at least with respect to the axial direction, and is guided into the second channel of the rotor laminated core. This flow guidance is analogous to a two-pass guidance in a heat exchanger and enables uniform cooling of the rotor laminated core.

With regard to further technical features and advantages of the rotor according to the invention, reference is hereby explicitly made to the explanations below in conjunction with the method for producing such a rotor according to the invention, as well as to the drawings and exemplary embodiments.

Another aspect of the invention relates to a method for producing a rotor as described above, the method comprising the following steps:

a) providing at least one disk having two circular ring-shaped surfaces, b) making recesses in at least one of the surfaces of the disk to form a channel structure, c) mounting the disk together with at least one further disk to form a disk pack, d) arranging the disk pack on the shaft of the rotor at one end face of the rotor laminated core, e) producing a joint between adjacent disks of a disk pack to form a short-circuit ring.

The disk provided in method step a) is usually made of copper or a copper alloy. Alternatively, it is also possible for it to be made of aluminum or an aluminum alloy. In method step a), the disk can be stamped from a strip or a sheet, for example. The making of the recesses in at least one of the surfaces of the disk in method step b) can advantageously be combined with method step a) by combining the two steps into one step, i.e., by performing them simultaneously and with a single tool. Alternatively, method step b) can also be carried out immediately after method step a). Both variants have the advantage that the making of the recesses is very closely linked to the provision of the disk and thus does not require any significant additional work. Also, in the alternative method variant in which step b) takes place immediately after step a), the disk is already singularized and does not have to be positioned separately. Furthermore, in method step b), further structural elements can advantageously be introduced into the disk. For example, the recesses for the ends of the rotor bars can be made. Method step b) can optionally also be applied to one or more further disks which are assembled in method step c) to form a disk pack. Method steps c) to e) can be carried out as known from document DE 10 2017 010 685 A1.

The advantages achieved with the invention are, in particular, that the recesses for the formation of the channel structure in a short-circuit ring are made without significant additional expense.

In an advantageous embodiment of the invention, the recesses can be made in step b) by milling, stamping, punching and/or drilling.

With regard to further technical features and advantages of the method according to the invention, reference is hereby explicitly made to the explanations in conjunction with the rotor according to the invention and to the drawings and exemplary embodiments.

BRIEF DESCRIPTION OF THE DRAWINGS

Exemplary embodiments of the invention are explained in greater detail with reference to the schematic drawings.

In the drawings.

Corresponding parts are provided with the same reference signs in all figures.

DETAILED DESCRIPTION

Figure 1:
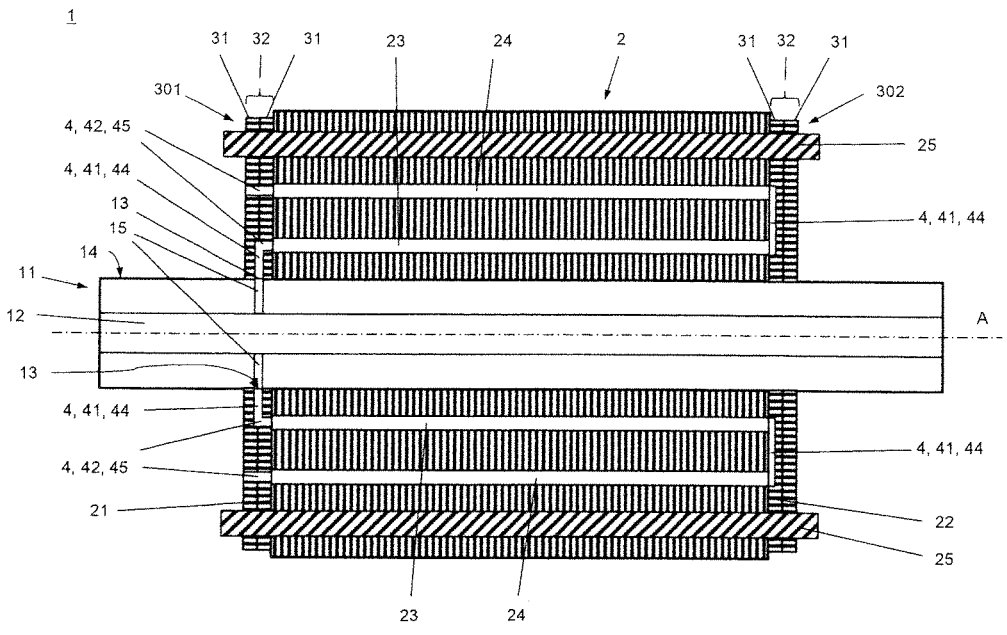
FIG. 1 shows a cross-section of a rotor.

FIG. 1 shows a cross-section of a rotor 1. The rotor 1 comprises a shaft 11 having an axis A. The shaft 11 is a substantially rotationally symmetrical body by which an axial direction, a radial direction and a circumferential direction are defined. For reasons of clarity, the shaft 11 is shown as a cylindrical body. The outer surface of the shaft in the radial direction is referred to as the lateral surface 14. In particular, the shaft 11 can have heels, threads and other features or elements, not shown, on its lateral surface 14. Inside the shaft 11, there is a cavity 12 extending along the axis A. Furthermore, the shaft 11 has channels 15 which extend in the radial direction and through which the cavity 12 is connected to passageways 13 on the lateral surface 14. FIG. 1 shows an example of two of these channels 15.

The shaft 11 is connected at its lateral surface 14 to a rotor laminated core 2. The rotor laminated core 2 has a plurality of channels 23, 24 that extend substantially in the axial direction through the entire rotor laminated core 2. Here, first channels 23 are located radially further inwards, while second channels 24 are located radially further outwards. In the radially outer region of the rotor laminated core 2 there are rotor bars 25 which extend in a manner known per se substantially in the axial direction through the rotor laminated core 2. The rotor bars 25 can have a twist. The rotor bars 25 each have an overhang beyond the rotor laminated core 2 at both end faces 21, 22 of the rotor laminated core 2. In the region of the overhang, the rotor bars 25 are mechanically and electrically conductively connected to short-circuit rings 301, 302, for example by soldering or welding. The short-circuit rings 301, 302 are constructed as disk packs 32. In this case, two disks 31 are connected flat to each other and are joined together to form a disk pack 32. It is also possible that a short-circuit ring 301, 302 is constructed from more than two disks 31. The inner diameter of the short-circuit rings 301, 302 is equal to the outer diameter of the shaft 11, so that the short-circuit rings 301, 302 are in contact with the lateral surface 14 of the shaft 11.

In the short-circuit ring 301 shown in FIG. 1 on the left end face 21 of the rotor laminated core 2, recesses 41, 42 in the form of depressions 44 and holes 45 are formed in the disks 31. The first recesses 41 of the two disks 31, which recesses extend in the radial direction, are each opposite one another in pairs and are formed in such a way that mutually opposite first recesses 41 of adjacent disks 31 together form a channel. In this regard, the first recesses 41 are formed such that the channel extends to the inner diameter of the short-circuit ring 301. The channel formed from the first recesses 41 ends opposite a passageway 13 located on the lateral surface 14 of the shaft 11, and is arranged in alignment with the channel 15 connecting the passageway 13 with the cavity 12 inside the shaft 11. The second recesses 42 extending in the axial direction are formed as holes 45 in the disks 31. They either connect a first recess 41 extending in the radial direction to a channel 23 in the rotor laminated core 2 or they connect a channel 24 in the rotor laminated core 2 to the surroundings of the rotor 1. By means of the first and second recesses 41, 42, a channel system 4 is formed in the short-circuit ring 301, through which fluid can be conducted from the cavity 12 of the shaft 11 into one or more channels 23 in the rotor laminated core 2 and fluid can be conducted from one or more channels 24 in the rotor laminated core 2 into the surroundings of the rotor 1.

In the short-circuit ring 302, which is shown in FIG. 1 on the right-hand end face 22 of the rotor laminated core 2, first recesses 41 extending in the radial direction are made in the form of depressions 44 in the disk 31, which bears directly against the rotor laminated core 2. These recesses 41 are shaped in such a way that they connect a radially further inward channel 23 of the rotor laminated core 2 to a radially further outward channel 24 of the rotor laminated core 2. Through the entirety of the recesses 41, a channel system 4 is formed in the short-circuit ring 302, through which fluid flowing from a radially further inward channel 23 of the rotor laminated core 2 can be received and supplied to a radially further outward channel 24 of the rotor laminated core 2.

The first and second recesses 41, 42 formed in the disks 31 of the short-circuit rings 301, 302 are configured such that a fluid supplied through the cavity 12 of the shaft 11 and passing through one or more channels 15 to one or more passageways 13 on the lateral surface 14 of the shaft 11 enters the channel system 4 of the first short-circuit ring 301, where it is supplied to one or more first channels 23 in the rotor laminated core 2. After the fluid has passed through such a channel 23, it enters the channel system 4 of the second short-circuit ring 302, where it is deflected by 180° and flows again through the rotor laminated core 2 in one or more second channels 24. The fluid leaves the rotor through the recesses 42, 45 made in the disks 31 of the first short-circuit ring 301 and flows into the surroundings, where it is collected again by suitable devices.

Figure 2:
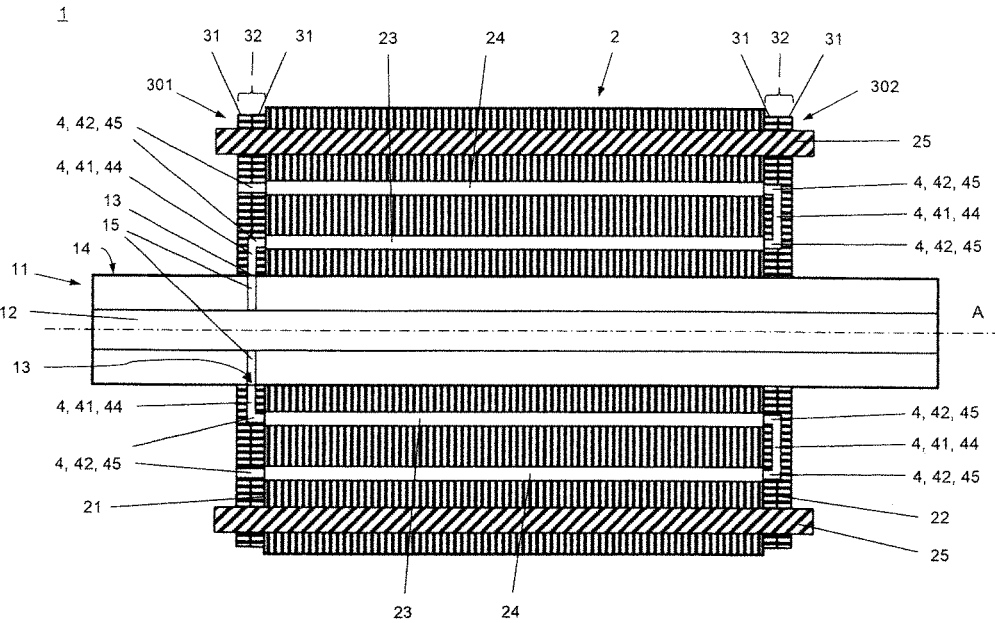
FIG. 2 shows a cross-section of another rotor.

FIG. 2 shows a cross-section of another rotor 1. The rotor 1 shown in FIG. 2 differs from the rotor 1 shown in FIG. 1 only in the design of the channel system 4 in the short-circuit ring 302, which is positioned on the right-hand end face 22 of the rotor laminated core 2. In the case illustrated in FIG. 2, first recesses 41 extending in the radial direction are provided in the form of depressions 44 in both disks 31 of the short-circuit ring 302. In this case, the recesses 41 of the two disks 31 are opposite each other in pairs and are formed so that together they form a channel. The disk 31, which is in direct contact with the rotor laminated core, also has second recesses 42 extending in the axial direction, which are designed as holes 45. These recesses 42 connect the first recesses 41 extending in the radial direction to the channels 23, 24 in the rotor laminated core 2. The function of the channel system 4 in the short-circuit ring 302 at the right-hand end face 22 of the rotor laminated core 2 in FIG. 2 is identical to the function of the channel system 4 in the short-circuit ring 302 at the right-hand end face 22 of the rotor laminated core 2 in FIG. 1.

Figure 3:
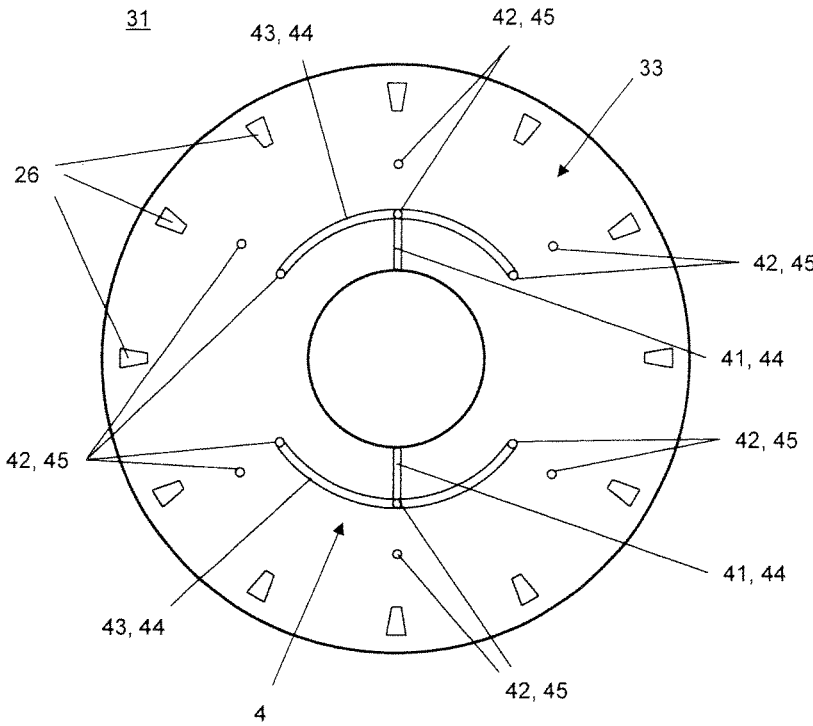
FIG. 3 shows a disk of a short-circuit ring.

FIG. 3 shows a plan view of the surface 33 of a disk 31 of a short-circuit ring 301. The disk 31 has the shape of a circular ring. The disk 31 has recesses 26 in the region of its outer edge for the ends of the rotor bars 25. The inner diameter of the disk 31 is matched to the outer diameter of the shaft 11. From the inner diameter of the disk 31, first recesses 41 in the form of groove-like depressions 44 extend radially outward. Each of these recesses 41 opens into a further recess 43 in the form of a notch-like depression 44 extending in the circumferential direction. Furthermore, the disk 31 has second recesses 42 in the form of holes 45 extending in the axial direction. These recesses 42 are arranged on two concentric circles of different diameter. Via these recesses 42, the channel system 4 is in fluidic connection with the ducts 23, 24 in the rotor laminated core.

Figure 4:
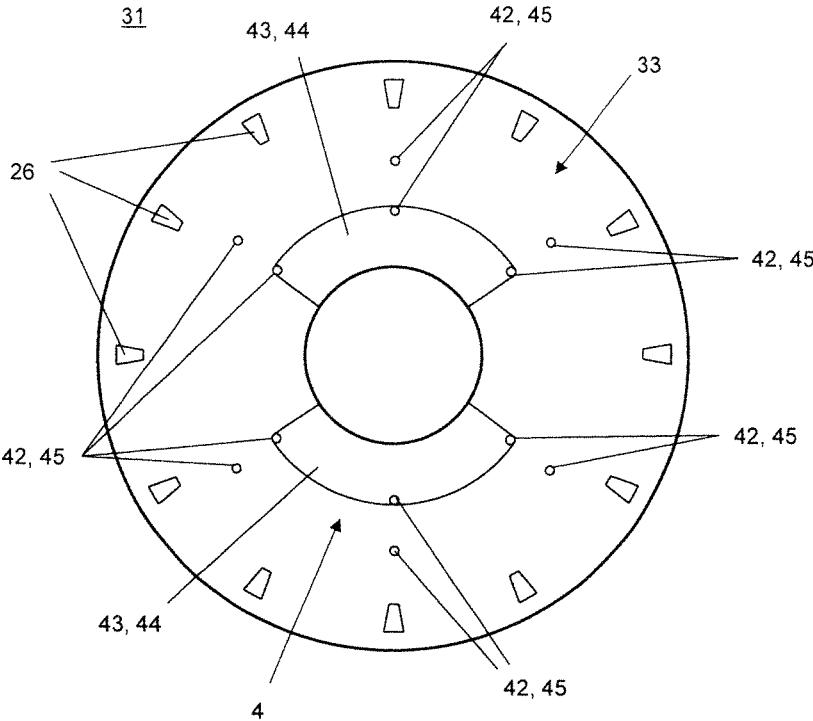
FIG. 4 shows an alternative embodiment of a disk of a short-circuit ring.

FIG. 4 shows a plan view of the surface 33 of an alternative embodiment of a disk 31 of a short-circuit ring 301. The disk 31 has recesses 42 in the form of holes 45 extending in the axial direction. These recesses 42 are arranged on two concentric circles of different diameter. Further recesses 43, which connect the inner diameter of the disk 31 to the recesses 42 extending in the axial direction and located on the inside of the two concentric circles extending in the axial direction, are designed here as flat depressions 44. This reduces the pressure drop of the fluid.

Figure 5:
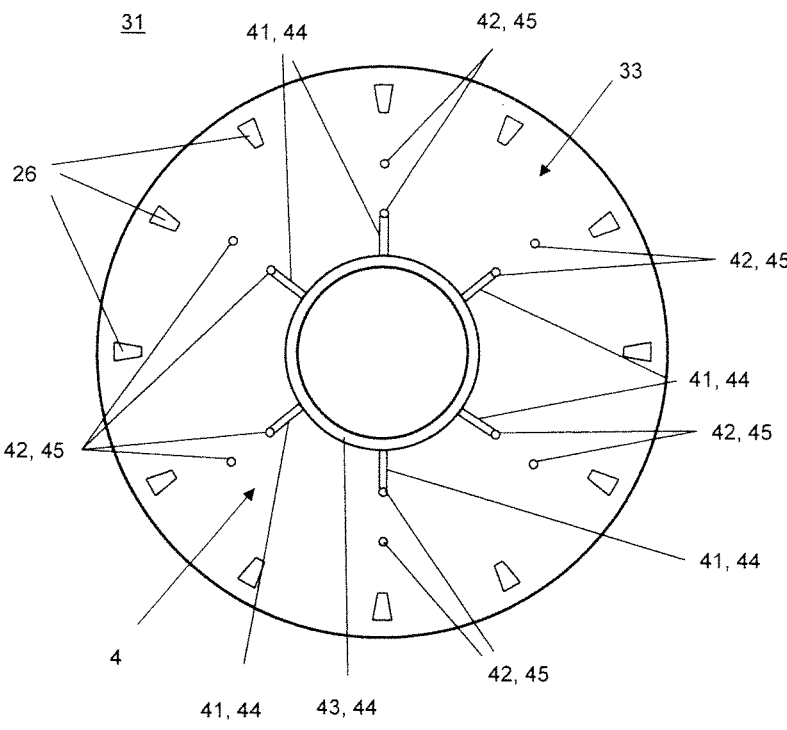
FIG. 5 shows another embodiment of a disk of a short-circuit ring.

FIG. 5 shows a plan view of the surface 33 of a further alternative embodiment of a disk 31 of a short-circuit ring 301. The disk 31 has, directly on its inner circumference, a circumferential recess 43 in the form of a depression 44. Through such a recess 43, fluid which is supplied to the short-circuit ring 301 only at one or two passageways 13 can be distributed over the entire circumference. Via recesses 41 extending in the radial direction, the fluid is supplied to the recesses 42 extending in the axial direction and further then to channels 23 in the rotor laminated core 2.

Figure 6:
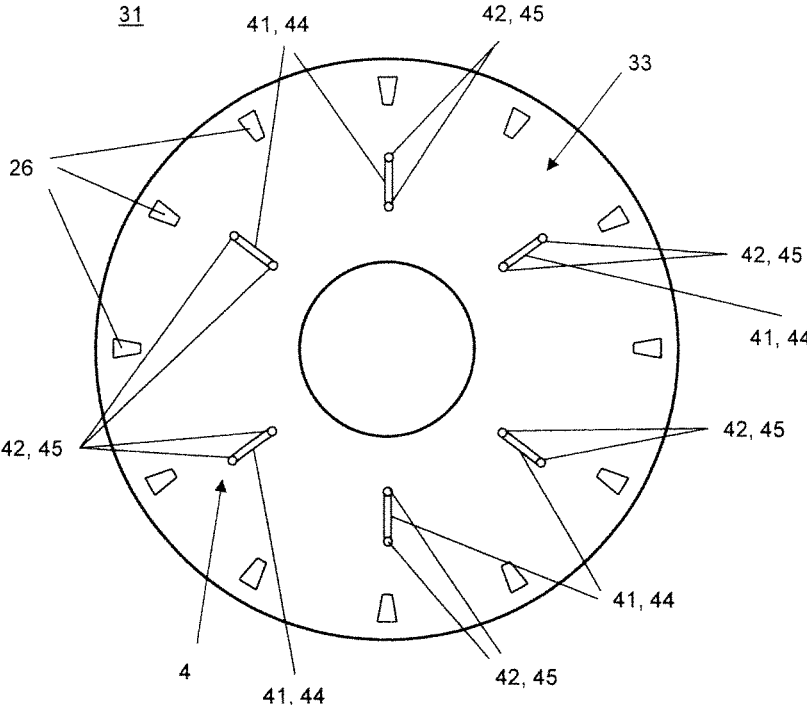
FIG. 6 shows a disk of a short-circuit ring with deflectors.

FIG. 6 shows a plan view of the surface 33 of a disk 31 of a short-circuit ring 302. The disk 31 has recesses 42 in the form of holes 45 extending in the axial direction. These recesses 42 are arranged on two concentric circles of different diameter. In each case, two of these recesses 42 are connected to one another by further recesses 41 extending in the radial direction. Through such a disk, the fluid flowing into the short-circuit ring from a first channel 23 of the rotor laminated core 2 can be deflected by 180° and supplied to a second channel 24 of the rotor laminated core.

The disclosure of the invention includes not only the exemplary embodiments of the invention shown in the figures, but also expedient combinations of features included in various figures. Further, it is possible to vary the size, number and position of the recesses in an expedient way. In particular, it may be advantageous to select the number and position of the recesses in such a way that the channels made in the rotor laminated core have a specific spatial association with the rotor bars.

The invention claimed is:

1. A rotor of an electric asynchronous machine comprising:

a shaft defining an axial direction, a radial direction, and a circumferential direction, the shaft having an outer lateral surface in the radial direction, a cavity extending within the shaft in the axial direction, at least one passageway located on the lateral surface of the shaft, and at least one channel connecting the cavity to the at least one passageway;

a rotor laminated core having a first end face and a second end face spaced from the first end face in the axial direction, the rotor laminated core having at least one channel extending within the rotor laminated core from the first end face to the second end face;

short-circuit rings attached to the first and second end faces of the rotor laminated core, at least one of the short-circuit rings being composed of at least two disks disposed in side-by-side adjacent relation with one another and interconnected to form a disk pack, each disk having two circular ring-shaped surfaces, and surfaces of adjacent disks facing each other being in surface contact, wherein at least one disk of at least one short-circuit ring has recesses arranged such that a channel structure is formed inside the short-circuit ring between the at least two disks and is in fluidic connection with at least one channel of the rotor laminated core and fluidically connects the at least one passageway on the lateral surface of the shaft to at least one channel of the rotor laminated core.

2. The rotor according to claim 1, wherein each short-circuit ring is composed of at least two disks interconnected to form a disk pack, and at least one disk of each short-circuit ring has recesses arranged to form, inside each of the short-circuit rings between the at least two disks, a channel structure in fluidic connection with at least one channel of the rotor laminated core.

3. The rotor according to claim 1, wherein at least one disk of a short-circuit ring has, on one of its surfaces, at least one recess in the form of a groove- or notch-like depression, by which groove- or notch-like depression, in combination with another disk of the short-circuit ring, a channel is formed between two of the disks of the short-circuit ring which channel constitutes at least part of the channel structure.

4. The rotor according to claim 3, wherein groove- or notch-like depressions of adjacent disks of the short-circuit ring are disposed opposite each other in pairs and are formed such that the groove- or notch-like depressions supplement each other to together form a channel.

5. The rotor according to claim 1, wherein the channel structure of at least one short-circuit ring comprises at least one first recess extending in the radial direction and at least one second recess extending in the axial direction.

6. The rotor according to claim 5, wherein the second recess extending in the axial direction is formed by a hole in at least one disk of a short-circuit ring.

7. The rotor according to claim 5, wherein the channel structure of at least one short-circuit ring comprises at least one third recess extending in the circumferential direction.

8. The rotor according to claim 3, wherein first recesses of at least one short-circuit ring have flow cross-sections that are different within the short-circuit ring and/or second recesses of at least one short-circuit ring have flow cross-sections that are different within the short-circuit ring and/or third recesses of at least one short-circuit ring have flow cross-sections that are different within the short-circuit ring.

9. The rotor according to claim 1, wherein the channel structure of at least one short-circuit ring comprises at least one recess formed as a planar depression and extending both in the radial direction and in the circumferential direction, and at least second recesses extending in the axial direction.

10. The rotor according to claim 1, wherein the rotor laminated core has at least one first channel and at least one second channel, and the channel structure in one of the short-circuit rings is configured such that a fluid flowing from the first channel of the rotor laminated core into the channel structure of the short-circuit ring is deflected there, at least with respect to the axial direction, and is guided into the second channel of the rotor laminated core.

11. A method for producing a rotor according to claim 1, the method comprising the following steps:

a) providing at least one disk having two circular ring-shaped surfaces;

b) making recesses in at least one of the surfaces of the disk to form a channel structure;

c) mounting the disk together with at least one further disk to form a disk pack, whereby the recesses form a channel structure between the disks;

d) arranging the disk pack on the shaft of the rotor at one end face of the rotor laminated core; and e) producing a joint between adjacent disks of a disk pack to form a short-circuit ring.

12. The method according to claim 11, wherein the recesses are made in step b) by milling, stamping, punching and/or drilling.

13. The rotor according to claim 1, wherein:

the short-circuit rings are made of copper, a copper alloy, aluminum or an aluminum alloy;

the rotor comprises rotor bars extending substantially in the axial direction through the rotor laminated core, each rotor bar having an overhang beyond the rotor laminated core at both of the first and second end faces; and each disk having an outer edge and recesses adjacent the outer edge for receiving the overhangs of the rotor bars, and the rotor bars are mechanically and electrically conductively connected to the disks at the overhangs.

14. The rotor according to claim 13, wherein the rotor bars are disposed further away from the shaft in the radial direction than the at least one channel.

15. A rotor of an electric asynchronous machine comprising:

a shaft defining a central longitudinal axis and having an outer lateral surface radially spaced from the axis, a cavity extending axially within the shaft, at least one passageway opening on the lateral surface of the shaft, and at least one channel connecting the cavity to the at least one passageway;

a rotor laminated core having a first end face and a second end face spaced therefrom in the axial direction, the rotor laminated core having at least one channel extending within the rotor laminated core from the first end face to the second end face; and first and second short-circuit rings respectively attached to the first and second end faces of the rotor laminated core, at least one of the first or second short-circuit rings comprising at least two disks interconnected to one another to form a disk pack, each of the at least two disks having circular and oppositely facing inner and outer ring-shaped surfaces, the at least two disks being disposed in side-by-side adjacent relation with one another such that the inner surfaces of the at least two disks face each other and are in surface contact, at least one disk of the at least one short-circuit ring having recesses arranged such that a channel structure is formed inside the at least one short-circuit ring between the at least two disks and is in fluidic connection with the at least one channel of the rotor laminated core and fluidly connects the at least one passageway on the lateral surface of the shaft to the at least one channel of the rotor laminated core.

* * * * *